United States Patent
Zeng et al.

(10) Patent No.: US 10,404,978 B2
(45) Date of Patent: Sep. 3, 2019

(54) DRIVING METHOD AND DRIVING SYSTEM FOR REDUCING RESIDUAL IMAGE OF AMOLED DISPLAY

(71) Applicant: Shenzhen China Star Optoelectronics Technology Co., Ltd., Shenzhen (CN)

(72) Inventors: Yuchao Zeng, Shenzhen (CN); Tai Jiun Hwang, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 201 days.

(21) Appl. No.: 15/327,313

(22) PCT Filed: Dec. 22, 2016

(86) PCT No.: PCT/CN2016/111514
§ 371 (c)(1),
(2) Date: Aug. 14, 2017

(87) PCT Pub. No.: WO2018/028113
PCT Pub. Date: Feb. 15, 2018

(65) Prior Publication Data
US 2018/0338138 A1 Nov. 22, 2018

(30) Foreign Application Priority Data

Aug. 10, 2016 (CN) .......................... 2016 1 0651599

(51) Int. Cl.
*H04N 19/102* (2014.01)
*G09G 3/32* (2016.01)

(52) U.S. Cl.
CPC ............ *H04N 19/102* (2014.11); *G09G 3/32* (2013.01)

(58) Field of Classification Search
CPC .............................. G09G 3/32; H04N 19/102
See application file for complete search history.

(56) References Cited

U.S. PATENT DOCUMENTS

| | | | |
|---|---|---|---|
| 5,553,219 A | 9/1996 | Kurashige | |
| 6,453,069 B1 * | 9/2002 | Matsugu | G06K 9/48 382/173 |

(Continued)

FOREIGN PATENT DOCUMENTS

| | | |
|---|---|---|
| CN | 101321234 A | 12/2008 |
| CN | 101689347 A | 3/2010 |

(Continued)

OTHER PUBLICATIONS

Chinese Office Action for related Chinese Application No. 201610651599.4; action dated Feb. 24, 2018; (5 pages).

(Continued)

*Primary Examiner* — Muhammad N Edun

(57) ABSTRACT

Disclosed is a driving method and a driving system for reducing a residual image of AMOLED display. The driving method includes: performing a high contrast edge detection on a static picture; determining an edge contrast of each pixel based on a result of the edge detection; adjusting an output luminance proportional coefficient of each pixel based on the edge contrast of each pixel and a position of each pixel itself; and outputting a luminance of each pixel by the output luminance proportional coefficient corresponding to each pixel. The driving method can improve the bright and dark difference ratio of the edge contours in the high contrast region of the image.

11 Claims, 5 Drawing Sheets

(56) References Cited

U.S. PATENT DOCUMENTS

| | | | | |
|---|---|---|---|---|
| 2008/0218782 | A1* | 9/2008 | Seki | ......................... G06T 5/20 |
| | | | | 358/1.9 |
| 2011/0096231 | A1 | 4/2011 | Winger et al. | |
| 2012/0182204 | A1 | 7/2012 | Ikeno et al. | |
| 2015/0358560 | A1* | 12/2015 | Boulanger | ............ H04N 5/332 |
| | | | | 348/164 |

FOREIGN PATENT DOCUMENTS

| | | | |
|---|---|---|---|
| CN | 102254536 | A | 11/2011 |
| CN | 103108201 | A | 5/2013 |
| CN | 103413149 | A | 11/2013 |
| CN | 103839509 | A | 6/2014 |
| CN | 104318893 | A | 1/2015 |
| CN | 104766561 | A | 7/2015 |
| CN | 104821160 | A | 8/2015 |
| CN | 105096829 | A | 11/2015 |
| CN | 106097970 | A | 11/2016 |
| JP | 2015008523 | A | 1/2015 |

OTHER PUBLICATIONS

International Search Report and Written Opinion for related International Application No. PCT/CN2016/111514; report dated May 2, 2017; (13 pages).

* cited by examiner

DRIVING METHOD AND DRIVING SYSTEM FOR REDUCING RESIDUAL IMAGE OF AMOLED DISPLAY

CROSS-REFERENCE TO RELATED APPLICATIONS

This application claims the priority of Chinese patent application CN201610651599.4, entitled "Driving Method and Driving System for Reducing Residual Image of AMO-LED Display" and filed on Aug. 10, 2016, the entirety of which is incorporated herein by reference.

FIELD OF THE INVENTION

The present disclosure relates to the field of OLED display, and in particular, to a driving method and a driving system for reducing a residual image of AMOLED display.

BACKGROUND OF THE INVENTION

The OLED (Organic Light Emitting Display) display technology is a new display technology developing rapidly in recent years. The OLED display technology is mainly to enable organic semiconductor materials and light-emitting materials to emit light and display through carrier injection and recombination under the drive of the electric field, based on the self-luminous properties of the organic light-emitting diode.

The drive mode of OLED display is divided into a PMOLED (Passive Matrix) drive and an AMOLED (Active Matrix) drive. In the AMOLED display, it is necessary to provide each pixel with a low temperature poly silicon thin film transistor (LTPS TFT) having a switch function to apply a drive voltage to the organic light emitting diode. Therefore, AMOLED will show the problem of a display residual image when performing a picture switching after displaying a static high contrast image for a period of time.

As shown in FIG. 1, in a static display high contrast image, there is a high luminance region, while in the next frame display image after the display picture is switched, as shown by the switched display picture in FIG. 1, there is no longer a high luminance region. Since a pixel having high luminance is applied with a higher pixel voltage, and the drive transistor of the pixel is aged faster than that of other pixels having low luminance, the next frame image actually displayed after the display picture is switched is as shown by the display residual image. For a high contrast display picture, since the image luminance difference is obvious, the drive transistor aging difference is more obvious, and thereby the high contrast display picture is more likely to leave a residual image.

The main method for solving the residual image of AMOLED display in the prior art is to multiply each pixel luminance in the displayed static picture by a uniform proportional coefficient for output, and improve the aging phenomenon of the transistor by reducing the drive voltage to thereby reduce the production of the residual image. However, for a high contrast static picture, after the overall luminance of the image is reduced, the pixel luminance difference between its high contrast region and the other regions is still large, and the image hierarchy is relatively obvious, which affects the effect of OLED display.

The present disclosure provides a solution to the above problem.

SUMMARY OF THE INVENTION

One of the technical problems to be solved by the present disclosure is to provide a method for reducing a display residual image of a high contrast static picture to improve its display effect.

In order to solve the above technical problem, embodiments of the present disclosure first provide a driving method for reducing a residual image of AMOLED display, comprising: detecting whether a picture to be displayed is a static picture; if it is judged as a static picture, performing a high contrast edge detection on the static picture; determining an edge contrast of each pixel in the static picture based on a result of the edge detection; adjusting an output luminance proportional coefficient of each pixel based on the edge contrast of each pixel and a position of each pixel itself; and outputting a luminance of each pixel by the output luminance proportional coefficient corresponding to each pixel.

Preferably, said performing a high contrast edge detection on the static picture comprises: traversing each pixel in the static picture line by line, comparing the luminance of each pixel with that of the left and right pixels of the pixel, marking horizontal start and end points of the high contrast edge, and determining a contrast of the horizontal start and end points; and traversing each pixel in the static picture column by column, comparing the luminance of each pixel with that of the upper and lower pixels of the pixel, marking vertical start and end points of the high contrast edge, and determining a contrast of the vertical start and end points.

Preferably, said marking horizontal start and end points of the high contrast edge comprises: traversing respective pixels in one line sequentially from left to right, when a ratio of the luminance of a pixel to that of a first pixel located on its left side is greater than a predetermined edge contrast threshold, marking the pixel as a horizontal start point of the high contrast edge; and when a ratio of the luminance of a pixel to that of a second pixel located on its right side is greater than a predetermined edge contrast threshold, marking the pixel as a horizontal end point of the high contrast edge.

Preferably, said determining an edge contrast of each pixel in the static picture based on a result of the edge detection comprises: determining a left edge contrast and a right edge contrast of each pixel, taking a left edge contrast of the horizontal start or end point, which is at the line where the pixel is located and is nearest to the left side of the pixel, as the left edge contrast of the pixel; and taking a right edge contrast of the horizontal start or end point, which is at the line where the pixel is located and is nearest to the right side of the pixel, as the right edge contrast of the pixel.

Preferably, said marking vertical start and end points of the high contrast edge comprises: traversing respective pixels in one column sequentially from top to bottom, when a ratio of the luminance of a pixel to that of a third pixel located above the pixel is greater than a predetermined edge contrast threshold, marking the pixel as a vertical start point of the high contrast edge; and when a ratio of the luminance of a pixel to that of a fourth pixel located below the pixel is greater than a predetermined edge contrast threshold, marking the pixel as a vertical end point of the high contrast edge.

Preferably, said determining an edge contrast of each pixel in the static picture based on a result of the edge detection comprises: determining an upper edge contrast and a lower edge contrast of each pixel, taking an upper edge contrast of the vertical start or end point, which is at the column where the pixel is located and is nearest to the upper side of the pixel, as the upper edge contrast of the pixel; and taking a lower edge contrast of the vertical start or end point, which is at the column where the pixel is located and is nearest to the lower side of the pixel, as the lower edge contrast of the pixel.

Preferably, said adjusting an output luminance proportional coefficient of each pixel based on the edge contrast of each pixel and a position of each pixel itself comprises: determining a horizontal contrast correlation and a vertical contrast correlation of each pixel based on a relative position of each pixel itself and each edge point located around it and the edge contrast of each pixel; determining a horizontal luminance reduction coefficient and a vertical luminance reduction coefficient of each pixel based on the horizontal contrast correlation and the vertical contrast correlation; and determining the output luminance proportional coefficient of each pixel based on the horizontal luminance reduction coefficient and the vertical luminance reduction coefficient and a static time sustained by the static picture.

Preferably, the horizontal contrast correlation and the vertical contrast correlation of each pixel are determined according to the following expression:

$$CH = \frac{x_2 - x}{x_2 - x_1} CL + \frac{x - x_1}{x_2 - x_1} CR$$

$$CV = \frac{y_2 - y}{y_2 - y_1} CU + \frac{y - y_1}{y_2 - y_1} CD$$

where, CH and CV are respectively the horizontal contrast correlation and the vertical contrast correlation of each pixel; $(x_1, y)$ is a position coordinate of the horizontal start or end point on the left side of each pixel; $(x_2, y)$ is a position coordinate of the horizontal start or end point on the right side of each pixel; $(x, y_1)$ is a position coordinate of the vertical start or end point on the upper side of each pixel; $(x, y_2)$ is a position coordinate of the vertical start or end point on the lower side of each pixel; CL, CR, CU and CD are respectively a left edge contrast, a right edge contrast, an upper edge contrast and a lower edge contrast of a pixel point.

Preferably, the output luminance proportional coefficient k of each pixel is determined according to the following expression:

$$\begin{cases} k = kH \times kV \times j(t), kH > kth_1, kV > kth_2 \\ k = kH \times kth_2 \times j(t), kH > kth_1, kV \leq kth_2 \\ k = kth_1 \times kV \times j(t), kH \leq kth_1, kV > kth_2 \\ k = kth_1 \times kth_2 \times j(t), kH \leq kth_1, kV \leq kth_2 \end{cases}$$

where, kH and kV are respectively the horizontal luminance reduction coefficient and the vertical luminance reduction coefficient of each pixel; $kth_1$ and $kth_2$ are respectively the minimum horizontal luminance reduction coefficient threshold and the minimum vertical luminance reduction coefficient threshold; j(t) is a time-varying luminance control function.

Embodiments of the present disclosure further provide a driving system for reducing a residual image of AMOLED display, comprising: a static picture detecting module, configured to detect whether a picture to be displayed is a static picture; an edge detecting module, configured to perform, if it is judged as a static picture, a high contrast edge detection on the static picture; an edge contrast determining module, configured to determine an edge contrast of each pixel in the static picture based on a result of the edge detection; a coefficient adjusting module, configured to adjust an output luminance proportional coefficient of each pixel based on the edge contrast of each pixel and a position of each pixel itself; and a processing output module, configured to output a luminance of each pixel by the output luminance proportional coefficient corresponding to each pixel.

Compared with the prior art, one or more embodiments in the above solution may have the following advantages or beneficial effects:

by performing an edge detection on a static picture to be displayed, and marking edge points and the edge contrast of each pixel in the static picture in turn, and then adjusting an output luminance proportional coefficient of each pixel based on the edge contrast of each pixel and a position of each pixel itself, it is possible to drive the pixel so that the contrast of the high contrast region in the static picture can be reduced, thereby improving the bright and dark difference ratio of the edge contours in the high contrast region of the image.

Other advantages, objects and features of the present disclosure at some extent will be illustrated in the following description, and to some extent, will be obvious to those skilled in the art based on the study of the following, or can be taught from the practice of the present disclosure. The objects and other advantages of the present disclosure can be achieved and obtained by the structures particularly pointed out in the following description, claims, and accompanying drawings.

BRIEF DESCRIPTION OF THE DRAWINGS

The accompanying drawings are used to provide a further understanding of the technical solution of the present disclosure or the prior art, and constitute a part of the description, wherein the accompanying drawings illustrating the embodiments of the present disclosure are used in conjunction with the embodiments of the present disclosure to explain the technical solution of the present disclosure, but do not constitute a limitation on the technical solution of the present disclosure.

DETAILED DESCRIPTION OF THE EMBODIMENTS

The implementation mode of the present disclosure will be described in detail below with reference to the accompanying drawings and embodiments, by means of which, the implementation process regarding how the present disclosure uses technical means to solve the technical problem and achieve the corresponding technical effect can be fully understood and implemented accordingly. The embodiments of the present disclosure and respective features in the embodiments can be combined with each other under the condition of no conflict, and the formed technical solutions are all within the protection scope of the present disclosure.

Figure 1:
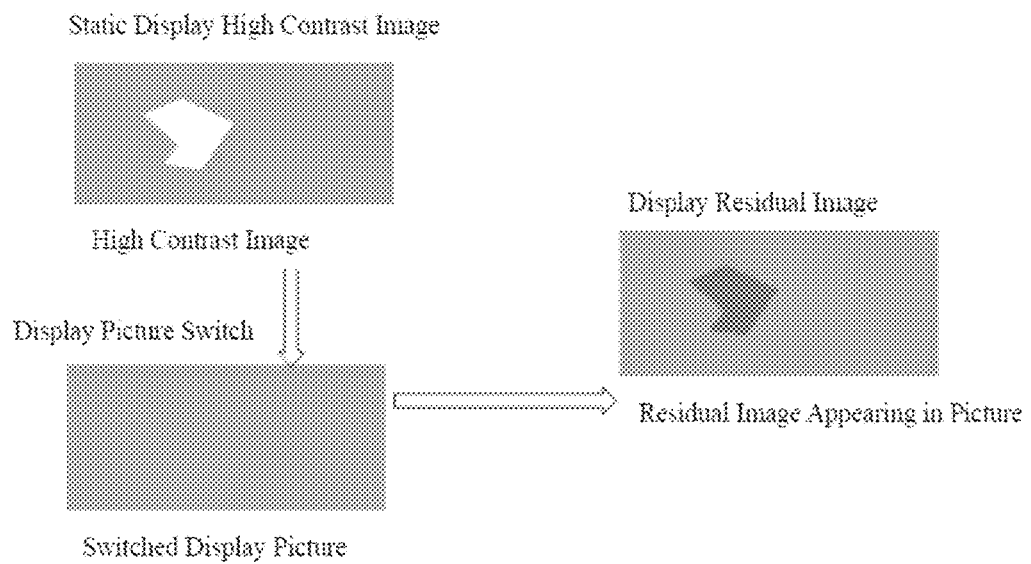
FIG. 1 is a schematic diagram of a production of a residual image of AMOLED display in the prior art.
Figure 2:
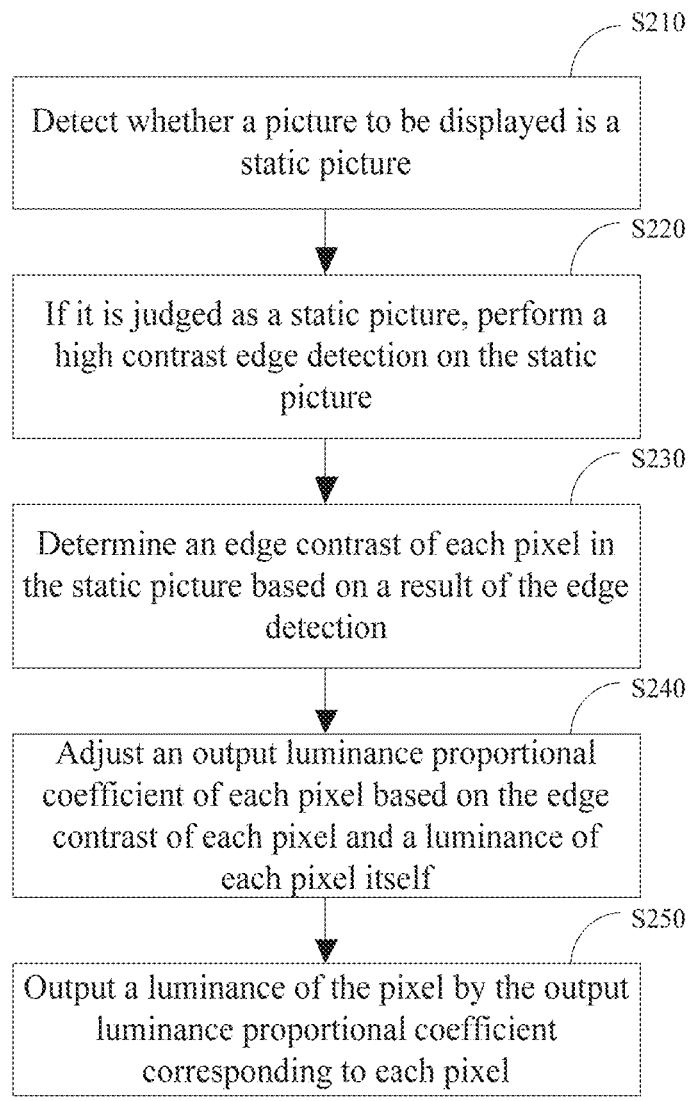
FIG. 2 is a flow schematic diagram of a driving method for reducing a residual image of AMOLED display according to embodiments of the present disclosure.

FIG. 2 is a flow schematic diagram of a driving method for reducing a residual image of AMOLED display according to embodiments of the present disclosure. As shown in FIG. 2, the driving method comprises steps of:

Step S210: detecting whether a picture to be displayed is a static picture;

Step S220: if it is judged as a static picture, performing a high contrast edge detection on the static picture;

Step S230: determining an edge contrast of each pixel in the static picture based on a result of the edge detection;

Step S240: adjusting an output luminance proportional coefficient of each pixel based on the edge contrast of each pixel and a position of each pixel itself; and Step S250: outputting a luminance of each pixel by the output luminance proportional coefficient corresponding to each pixel.

Specifically, in Step S210, it is first judged by detection whether a picture to be displayed is a static picture, and if it is not a static picture, it is unnecessary to perform a luminance adjustment. Only when it is judged as a static picture, will Step S220 be continued.

In Step S220, performing a high contrast edge detection on the static picture to be displayed so as to obtain information of the high contrast region therein.

In one embodiment of the present disclosure, a high contrast edge detection on the static picture is performed based on the following method, comprising traversing each pixel in the static picture line by line, comparing the luminance of each pixel with that of the left and right pixels of the pixel, marking horizontal start and end points of the high contrast edge, and determining a contrast of the horizontal start and end points; and traversing each pixel in the static picture column by column, comparing the luminance of each pixel with that of the upper and lower pixels of the pixel, marking vertical start and end points of the high contrast edge, and determining a contrast of the vertical start and end points.

Further, when marking horizontal start and end points of the high contrast edge, each line of pixels in the static picture is traversed from top to bottom, and for each line of pixels, respective pixels in one line are traversed sequentially from left to right. When a ratio of the luminance of a pixel to that of a first pixel located on its left side is greater than a predetermined edge contrast threshold, the pixel is marked as a horizontal start point of the high contrast edge. When a ratio of the luminance of a pixel to that of a second pixel located on its right side is greater than a predetermined edge contrast threshold, the pixel is marked as a horizontal end point of the high contrast edge.

Likewise, when marking vertical start and end points of the high contrast edge, each column of pixels in the static picture is traversed from left to right, and for each column of pixels, respective pixels in one column are traversed sequentially from top to bottom. When a ratio of the luminance of a pixel to that of a third pixel located above the pixel is greater than a predetermined edge contrast threshold, the pixel is marked as a vertical start point of the high contrast edge. When a ratio of the luminance of a pixel to that of a fourth pixel located below the pixel is greater than a predetermined edge contrast threshold, the pixel is marked as a vertical end point of the high contrast edge.

It should be noted that the edge contrast threshold can be determined based on the parameter of the display panel or by a panel-based experiment, and unequal edge contrast thresholds can be employed when marking the horizontal start and end points and the vertical start and end points.

Figure 3:
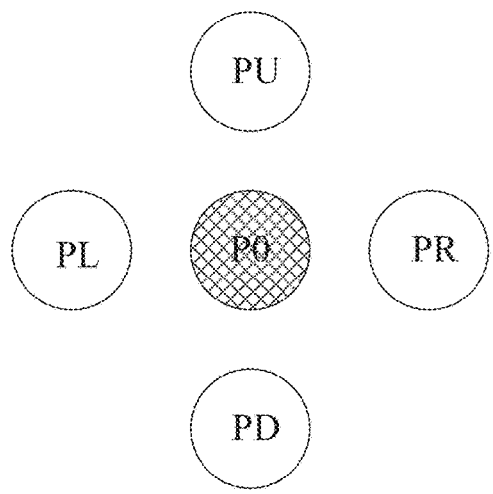
FIG. 3 is a schematic diagram of marking edge points in a static picture to be displayed.

For example, as shown in FIG. 3, P0 point is the current pixel point to be examined, and for P0, the pixel points PL and PR that are located in the same line as P0 as well as the pixel points PU and PD that are located in the same column as P0 are examined separately. The luminance of the pixel point P0 is denoted as Y0; the luminances of the pixel points PL, PR, PU and PD are denoted as YL, YR, YU and YD, respectively; the edge contrast thresholds for determining the horizontal start and end points, and for determining the vertical start and the end points are equal and denoted as Cth.

According to the above comparison principle, when Y0/YL>Cth, P0 is marked as a horizontal start point, and when Y0/YR>Cth, P0 is marked as a horizontal end point; when Y0/YU>Cth, P0 is marked as a vertical start point, and when Y0/YD>Cth, the P0 is marked as a vertical end point. As shown in the first and second columns in Table 1:

TABLE 1

Marking Principle and Attribute Statistics of Edge Points

| Condition | Edge Point Marking | Edge Contrast |
| --- | --- | --- |
| Y0/YL > Cth | Marked as a horizontal start point | CL = Y0/YL, CR = 1 |
| Y0/YR > Cth | Marked as a horizontal end point | CL = 1, CR = Y0/YR |
| Y0/YU > Cth | Marked as a vertical start point | CU = Y0/YU, CD = 1 |
| Y0/YD > Cth | Marked as a vertical end point | CU = 1, CD = Y0/YD |

When marking horizontal start points, horizontal end points, vertical start points and vertical end points in the static picture, the edge contrast corresponding to each horizontal start point, horizontal end point, vertical start point and vertical end point should also be marked, as shown in the third column in Table 1.

For a horizontal start point and a horizontal end point, their left edge contrast and right edge contrast are determined, wherein the value of the left edge contrast CL of the horizontal start point is Y0/YL and the value of the right edge contrast CR is 1; the value of the left edge contrast CL of the horizontal end point is 1 and the value of the right edge contrast CR is Y0/YR; the value of the upper edge contrast CU of the vertical start point is Y0/YU and the value of the lower edge contrast CD is 1; the value of the upper edge contrast CU of the vertical start point is 1 and the value of the lower edge contrast CD is Y0/YD.

It should be noted that the first pixel of each line (horizontal or vertical) can be set as the start point, the edge contrast of which is specified as 1, and the last pixel can be set as the end point, the edge contrast of which is specified as 1.

Through the previous steps, it is possible to obtain a plurality of horizontal start points, horizontal end points, vertical start points, and vertical end points having high contrast edge attributes in the static picture to be displayed. Next, in Step S230, the edge contrast of each pixel in the static picture is determined based on the marked horizontal start points, horizontal end points, vertical start points, and vertical end points.

In one embodiment of the present disclosure, the edge contrast of each pixel point (except the plurality of horizontal start points, horizontal end points, vertical start points, and vertical end points) in the static picture to be displayed is related to the edge contrast of each edge point located around it.

Specifically, when determining a left edge contrast and a right edge contrast of each pixel, a left edge contrast of the horizontal start or end point, which is at the line where the pixel is located and is nearest to the left side of the pixel, is taken as the left edge contrast of the pixel, and a right edge contrast of the horizontal start or end point, which is at the line where the pixel is located and is nearest to the right side of the pixel, is taken as the right edge contrast of the pixel. This can be specifically divided into four different situations, as shown in FIGS. 4a-4d, which are respectively illustrated below in conjunction with the accompanying drawings.

Figure 4A:
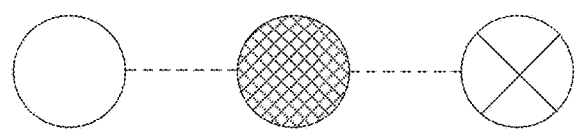
FIGS. 4a-4h are schematic diagrams of determining an edge contrast of any pixel point according to edge points.

In FIG. 4a, the edge point on the left side of a pixel is a start point, and the edge point on the right side of the pixel is also a start point, then the left edge contrast of the start point on the left side is taken as the left edge contrast of the pixel point. If the left edge contrast of the start point on the left side is denoted as CL1, then the left edge contrast of the pixel point is CL1. The right edge contrast of the start point on the right side is taken as the right edge contrast of the pixel point. According to Table 1, the right edge contrast of the start point is 1, then the right edge contrast of the pixel point is 1. Thus, the edge contrast of the pixel point is denoted as (CL1, 1).

Figure 4B:
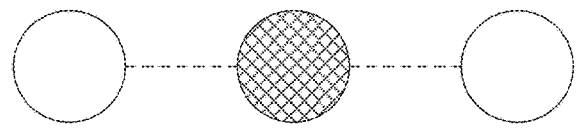

In FIG. 4b, the edge point on the left side of a pixel is a start point, and the edge point on the right side of the pixel is an end point, then the left edge contrast of the start point on the left side is taken as the left edge contrast of the pixel point. If the left edge contrast of the start point on the left side is denoted as CL, then the left edge contrast of the pixel point is CL. The right edge contrast of the end point on the right side is taken as the right edge contrast of the pixel point. If the right edge contrast of the end point on the right side is denoted as CR, then the right edge contrast of the pixel point is CR. Thus, the edge contrast of the pixel point is denoted as (CL, CR).

Figure 4C:
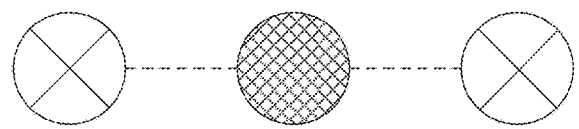

In FIG. 4c, the edge point on the left side of a pixel is an end point, and the edge point on the right side of the pixel is a start point, then the left edge contrast of the end point on the left side is taken as the left edge contrast of the pixel point. According to Table 1, the left edge contrast of the end point is 1, then the left edge contrast of the pixel point is 1. The right edge contrast of the start point on the right side is taken as the right edge contrast of the pixel point. According to Table 1, the right edge contrast of the start point is 1, then the right edge contrast of the pixel point is 1. Thus, the edge contrast of the pixel point is denoted as (1, 1).

Figure 4D:
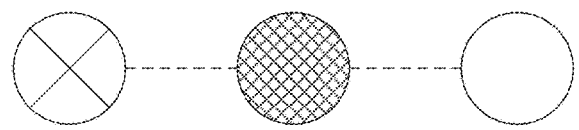

In FIG. 4d, the edge point on the left side of a pixel is an end point, and the edge point on the right side of the pixel is also an end point, then the left edge contrast of the end point on the left side is taken as the left edge contrast of the pixel point. According to Table 1, the left edge contrast of the end point is 1, then the left edge contrast of the pixel point is 1. The right edge contrast of the end point on the right side is taken as the right edge contrast of the pixel point. If the right edge contrast of the end point on the right side is denoted as CR2, then the right edge contrast of the pixel point is CR2. Thus, the edge contrast of the pixel point is denoted as (1, CR2).

Further, it is also necessary to determine an upper edge contrast and a lower edge contrast of each pixel, wherein an upper edge contrast of the vertical start or end point, which is at the column where the pixel is located and is nearest to the upper side of the pixel, is taken as the upper edge contrast of the pixel; and a lower edge contrast of the vertical start or end point, which is at the column where the pixel is located and is nearest to the lower side of the pixel, is taken as the lower edge contrast of the pixel.

Specifically, when determining the upper edge contrast and the lower edge contrast of each pixel, an upper edge contrast of the vertical start or end point, which is at the column where the pixel is located and is nearest to the upper side of the pixel, is taken as the upper edge contrast of the pixel; and a lower edge contrast of the vertical start or end point, which is at the column where the pixel is located and is nearest to the lower side of the pixel, is taken as the lower edge contrast of the pixel. This can be specifically divided into four different situations, as shown in FIGS. 4e-4h, which are respectively illustrated below in conjunction with the accompanying drawings.

Figure 4E:
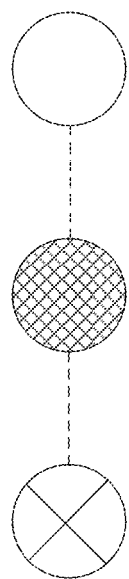

In FIG. 4e, the edge point on the upper side of a pixel is a start point, and the edge point on the lower side of the pixel is also a start point, then the upper edge contrast of the start point on the upper side is taken as the upper edge contrast of the pixel point. If the upper edge contrast of the start point on the upper side is denoted as CU1, then the upper edge contrast of the pixel point is CU1. The lower edge contrast of the start point on the lower side is taken as the lower edge contrast of the pixel point. According to Table 1, the lower edge contrast of the start point is 1, then the lower edge contrast of the pixel point is 1. Thus, the edge contrast of the pixel point is denoted as (CU1, 1).

Figure 4F:
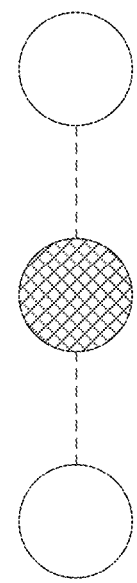

In FIG. 4f, the edge point on the upper side of a pixel is a start point, and the edge point on the lower side of the pixel is an end point, then the upper edge contrast of the start point on the upper side is taken as the upper edge contrast of the pixel point. If the upper edge contrast of the start point on the upper side is denoted as CU, then the upper edge contrast of the pixel point is CU. The lower edge contrast of the end point on the lower side is taken as the lower edge contrast of the pixel point. If the lower edge contrast of the end point on the lower side is denoted as CD, then the lower edge contrast of the pixel point is CD. Thus, the edge contrast of the pixel point is denoted as (CU, CD).

Figure 4G:
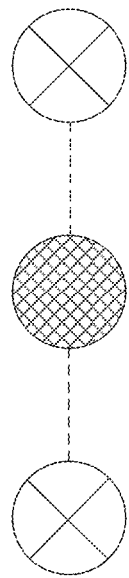

In FIG. 4g, the edge point on the upper side of a pixel is an end point, and the edge point on the lower side of the pixel is a start point, then the upper edge contrast of the end point on the upper side is taken as the upper edge contrast of the pixel point. According to Table 1, the upper edge contrast of the end point is 1, then the upper edge contrast of the pixel point is 1. The lower edge contrast of the start point on the lower side is taken as the lower edge contrast of the pixel point. According to Table 1, the lower edge contrast of the start point is 1, then the lower edge contrast of the pixel point is 1. Thus, the edge contrast of the pixel point is denoted as (1, 1).

Figure 4H:
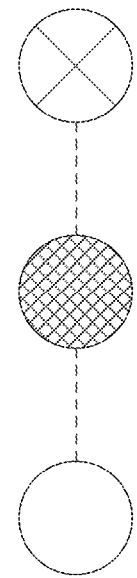

In FIG. 4h, the edge point on the upper side of a pixel is an end point, and the edge point on the lower side of the pixel is also an end point, then the upper edge contrast of the end point on the upper side is taken as the upper edge contrast of the pixel point. According to Table 1, the upper edge contrast of the end point is 1, then the upper edge contrast of the pixel point is 1. The lower edge contrast of the end point on the lower side is taken as the lower edge contrast of the pixel point. If the lower edge contrast of the end point on the lower side is denoted as CD2, then the lower edge contrast of the pixel point is CD2. Thus, the edge contrast of the pixel point is denoted as (1, CD2).

Then, in step S240, firstly a horizontal contrast correlation and a vertical contrast correlation of each pixel are determined based on a relative position of each pixel itself and each edge point located around it and the edge contrast of each pixel.

Figure 5:
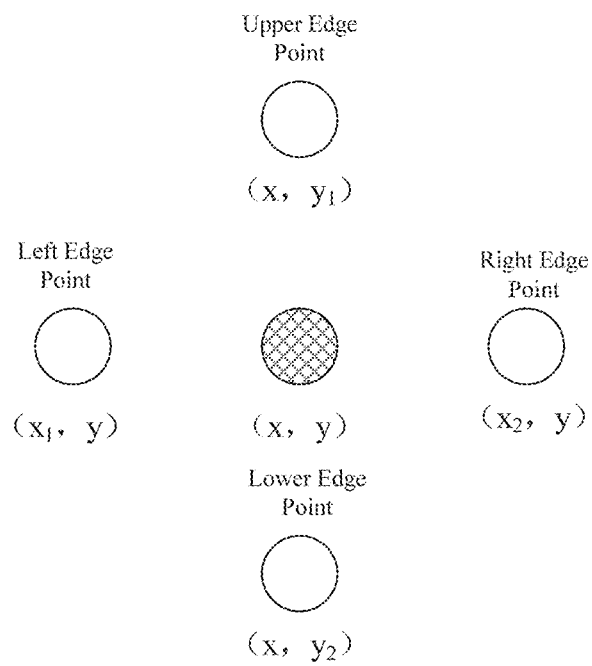
FIG. 5 is a schematic diagram of a relative position between the edge points and the pixel when adjusting the output luminance proportional coefficient.

In one embodiment of the present disclosure, the horizontal contrast correlation and the vertical contrast correlation of each pixel are determined according to the following Expression (1):

$$CH = \frac{x_2 - x}{x_2 - x_1}CL + \frac{x - x_1}{x_2 - x_1}CR \quad (1)$$
$$CV = \frac{y_2 - y}{y_2 - y_1}CU + \frac{y - y_1}{y_2 - y_1}CD$$

where, as shown in FIG. 5, CH and CV are respectively the horizontal contrast correlation and the vertical contrast correlation of each pixel; $(x_1, y)$ is a position coordinate of a left edge point (the horizontal start or end point); $(x_2, y)$ is a position coordinate of a right edge point (the horizontal start or end point); $(x, y_1)$ is a position coordinate of an upper edge point (the vertical start or end point); $(x, y_2)$ is a position coordinate of a lower edge point (the vertical start or end point); CL, CR, CU and CD are respectively a left edge contrast, a right edge contrast, an upper edge contrast and a lower edge contrast of a pixel point.

Secondly, a horizontal luminance reduction coefficient and a vertical luminance reduction coefficient of each pixel are determined based on the horizontal contrast correlation and the vertical contrast correlation of each pixel.

In one embodiment of the present disclosure, the horizontal luminance reduction coefficient and the vertical luminance reduction coefficient of each pixel are determined according to the following Expression (2):

$$\begin{cases} kH = \frac{Cth}{CH}, CH > Cth \\ kH = 1, CH \leq Cth \end{cases} \quad \begin{cases} kV = \frac{Cth}{CV}, CV > Cth \\ kV = 1, CV \leq Cth \end{cases} \quad (2)$$

where, kH and kV are respectively the horizontal luminance reduction coefficient and the vertical luminance reduction coefficient of each pixel; Cth is a predetermined edge contrast threshold.

Finally, the output luminance proportional coefficient of each pixel is determined based on the horizontal luminance reduction coefficient and the vertical luminance reduction coefficient and a static time sustained by the static picture to be displayed.

In one embodiment of the present disclosure, the output luminance proportional coefficient k of each pixel is determined according to the following Expression (3):

$$\begin{cases} k = kH \times kV \times j(t), kH > kth_1, kV > kth_2 \\ k = kH \times kth_2 \times j(t), kH > kth_1, kV \leq kth_2 \\ k = kth_1 \times kV \times j(t), kH \leq kth_1, kV > kth_2 \\ k = kth_1 \times kth_2 \times j(t), kH \leq kth_1, kV \leq kth_2 \end{cases} \quad (3)$$

where, kH and kV are respectively the horizontal luminance reduction coefficient and the vertical luminance reduction coefficient of each pixel; $kth_1$ and $kth_2$ are respectively the minimum horizontal luminance reduction coefficient threshold and the minimum vertical luminance reduction coefficient threshold; j(t) is a time-varying luminance control function. For example, in one embodiment, $kth_1 = kth_2 = 0.85$ and $$j(t) = 1.05 * e^{\frac{t}{36000}}.$$

As can be seen from the Expression (3), the luminance reduction coefficient in the embodiment of the present disclosure is related to the corresponding pixel edge point position and the edge contrast of the pixel, and meanwhile is related to the static picture time. According to the method in the present embodiment, it is possible to more comprehensively consider the generation of the residual image of the static picture, and adjusting the luminance based on space and time can effectively reduce the occurrence of the residual image and improve the picture quality.

Figure 6:
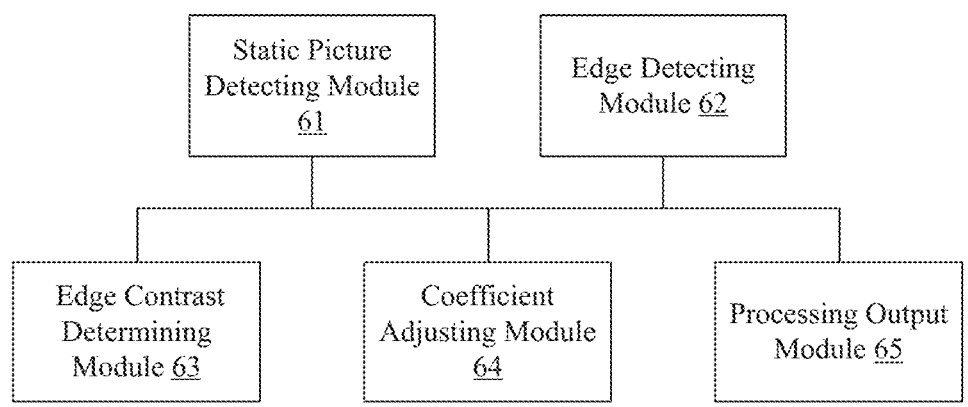
FIG. 6 is a structural schematic diagram of a driving system for reducing a residual image of AMOLED display according to embodiments of the present disclosure.

In another embodiment of the present disclosure, there is further provided a driving system for reducing a residual image of AMOLED display. As shown in FIG. 6, the system comprises:

a static picture detecting module 61, configured to detect whether a picture to be displayed is a static picture;

an edge detecting module 62, configured to perform, if it is judged as a static picture, a high contrast edge detection on the static picture;

an edge contrast determining module 63, configured to determine an edge contrast of each pixel in the static picture based on a result of the edge detection;

a coefficient adjusting module 64, configured to adjust an output luminance proportional coefficient of each pixel based on the edge contrast of each pixel and a position of each pixel itself; and a processing output module 65, configured to output a luminance of each pixel by the output luminance proportional coefficient corresponding to each pixel.

The functions of the respective modules described above can be performed with reference to the corresponding method steps in the previous embodiment, which is not detailed here.

In the embodiments of the present disclosure, by performing an edge detection on a static picture to be displayed, and marking edge points and the edge contrast of each pixel in the static picture in turn, and then adjusting an output luminance proportional coefficient of each pixel based on the edge contrast of each pixel and a position of each pixel itself, it is possible to drive the pixel so that the contrast of the high contrast region in the static picture can be reduced, thereby improving the bright and dark difference ratio of the edge contours in the high contrast region of the image.

According to the method in the embodiments of the present disclosure, driving and displaying AMOLED can reduce a residual image of a static picture, thereby improving the display effect.

Those skilled in the art should understand that respective modules or steps as described above in the present disclosure can be implemented by a general purpose computing device, and they can be concentrated on a single computing device or distributed over a network of a plurality of computing devices. Alternatively, they can be implemented by program codes executable by the computing device, and thereby they can be stored in a storage device to be performed by a computing device, or they be can implemented by being separately made into respective integrated circuit modules, or by making multiple modules or steps among them into a single integrated circuit module. Thus, the present disclosure is not limited to any particular combination of hardware and software.

Although the embodiments disclosed by the present disclosure are described as above, the described contents are merely implementation modes employed for the purpose of facilitating the understanding of the present disclosure, and are not intended to limit the present disclosure. Any person skilled in the technical field of the present disclosure could make any modification and variation in the implementation forms and details, without departing from the spirit and scope of the present disclosure, but the patent protection scope of the present disclosure still needs to be based on the scope as defined in the appended claims.

The invention claimed is:

1. A driving method for reducing a residual image of AMOLED display, comprising:
    detecting whether a picture to be displayed is a static picture;
    if the picture to be displayed is judged as a static picture, performing a high contrast edge detection on the static picture;
    determining an edge contrast of each pixel in the static picture based on a result of the edge detection;
    adjusting an output luminance proportional coefficient of each pixel based on the edge contrast of each pixel and a position of each pixel itself; and
    outputting a luminance of each pixel by the output luminance proportional coefficient corresponding to each pixel.

2. The driving method according to claim 1, wherein the step of performing a high contrast edge detection on the static picture comprises:
    traversing each pixel in the static picture line by line, comparing the luminance of each pixel with those of its left and right pixels, marking horizontal start and end points of the high contrast edge, and determining a contrast of the horizontal start and end points; and
    traversing each pixel in the static picture column by column, comparing the luminance of each pixel with those of its upper and lower pixels, marking vertical start and end points of the high contrast edge, and determining a contrast of the vertical start and end points.

3. The driving method according to claim 2, wherein the step of marking horizontal start and end points of the high contrast edge comprises: traversing respective pixels in one line sequentially from left to right,
    wherein when a ratio of the luminance of a pixel to that of a first pixel located on its left side is greater than a predetermined edge contrast threshold, the pixel is marked as a horizontal start point of the high contrast edge; and
    wherein when a ratio of the luminance of a pixel to that of a second pixel located on its right side is greater than a predetermined edge contrast threshold, the pixel is marked as a horizontal end point of the high contrast edge.

4. The driving method according to claim 3, wherein the step of determining an edge contrast of each pixel in the static picture based on a result of the edge detection comprises: determining a left edge contrast and a right edge contrast of each pixel,
    wherein a left edge contrast of the horizontal start or end point, which is at a line where the pixel is located and is nearest to the left side of the pixel, is taken as the left edge contrast of the pixel; and
    wherein a right edge contrast of the horizontal start or end point, which is at a line where the pixel is located and is nearest to the right side of the pixel, is taken as the right edge contrast of the pixel.

5. The driving method according to claim 2, wherein the step of marking vertical start and end points of the high contrast edge comprises: traversing respective pixels in one column sequentially from top to bottom,
    wherein when a ratio of the luminance of a pixel to that of a third pixel located above the pixel is greater than a predetermined edge contrast threshold, the pixel is marked as a vertical start point of the high contrast edge; and
    wherein when a ratio of the luminance of a pixel to that of a fourth pixel located below the pixel is greater than a predetermined edge contrast threshold, the pixel is marked as a vertical end point of the high contrast edge.

6. The driving method according to claim 4, wherein the step of marking vertical start and end points of the high contrast edge comprises: traversing respective pixels in one column sequentially from top to bottom,
    wherein when a ratio of the luminance of a pixel to that of a third pixel located above the pixel is greater than a predetermined edge contrast threshold, the pixel is marked as a vertical start point of the high contrast edge; and
    wherein when a ratio of the luminance of a pixel to that of a fourth pixel located below the pixel is greater than a predetermined edge contrast threshold, the pixel is marked as a vertical end point of the high contrast edge.

7. The driving method according to claim 5, wherein the step of determining an edge contrast of each pixel in the static picture based on a result of the edge detection comprises: determining an upper edge contrast and a lower edge contrast of each pixel,
    wherein an upper edge contrast of the vertical start or end point, which is at a column where the pixel is located and is nearest to an upper side of the pixel, is taken as the upper edge contrast of the pixel; and
    wherein a lower edge contrast of the vertical start or end point, which is at a column where the pixel is located and is nearest to a lower side of the pixel, is taken as the lower edge contrast of the pixel.

8. The driving method according to claim 7, wherein the step of adjusting an output luminance proportional coefficient of each pixel based on the edge contrast of each pixel and a position of each pixel itself comprises:
    determining a horizontal contrast correlation and a vertical contrast correlation of each pixel based on a relative position of each pixel itself and each edge point located around it and the edge contrast of each pixel;
    determining a horizontal luminance reduction coefficient and a vertical luminance reduction coefficient of each pixel based on the horizontal contrast correlation and the vertical contrast correlation; and
    determining the output luminance proportional coefficient of each pixel based on the horizontal luminance reduction coefficient and the vertical luminance reduction coefficient and a static time sustained by the static picture.

9. The driving method according to claim 8, wherein the horizontal contrast correlation and the vertical contrast correlation of each pixel are determined according to the following expression:

$$CH = \frac{x_2 - x}{x_2 - x_1} CL + \frac{x - x_1}{x_2 - x_1} CR$$

-continued $$CV = \frac{y_2 - y}{y_2 - y_1}CU + \frac{y - y_1}{y_2 - y_1}CD$$

where, CH and CV are respectively the horizontal contrast correlation and the vertical contrast correlation of each pixel; $(x_1, y)$ is a position coordinate of the horizontal start or end point on the left side of each pixel; $(x_2, y)$ is a position coordinate of the horizontal start or end point on the right side of each pixel; $(x, y_1)$ is a position coordinate of the vertical start or end point on the upper side of each pixel; $(x, y_2)$ is a position coordinate of the vertical start or end point on the lower side of each pixel; CL, CR, CU and CD are respectively a left edge contrast, a right edge contrast, an upper edge contrast and a lower edge contrast of a pixel point.

10. The driving method according to claim 9, wherein the output luminance proportional coefficient k of each pixel is determined according to the following expression:

$$\begin{cases} k = kH \times kV \times j(t), kH > kth_1, kV > kth_2 \\ k = kH \times kth_2 \times j(t), kH > kth_1, kV \leq kth_2 \\ k = kth_1 \times kV \times j(t), kH \leq kth_1, kV > kth_2 \\ k = kth_1 \times kth_2 \times j(t), kH \leq kth_1, kV \leq kth_2 \end{cases}$$

where, kH and kV are respectively the horizontal luminance reduction coefficient and the vertical luminance reduction coefficient of each pixel; $kth_1$ and $kth_2$ are respectively a minimum horizontal luminance reduction coefficient threshold and a minimum vertical luminance reduction coefficient threshold; j(t) is a time-varying luminance control function.

11. A driving system for reducing a residual image of AMOLED display, comprising:

a static picture detecting module, configured to detect whether a picture to be displayed is a static picture;

an edge detecting module, configured to perform, if the picture to be displayed is judged as a static picture, a high contrast edge detection on the static picture;

an edge contrast determining module, configured to determine an edge contrast of each pixel in the static picture based on a result of the edge detection;

a coefficient adjusting module, configured to adjust an output luminance proportional coefficient of each pixel based on the edge contrast of each pixel and a position of each pixel itself; and a processing output module, configured to output a luminance of each pixel by the output luminance proportional coefficient corresponding to each pixel.

* * * * *